(12) United States Patent
Lin

(10) Patent No.: US 7,203,057 B2
(45) Date of Patent: Apr. 10, 2007

(54) PORTABLE ELECTRONICS APPARATUS

(75) Inventor: Ying-Shi Lin, Banqiao (TW)

(73) Assignee: Benq Corporation, Taoyuan (TW)

( * ) Notice: Subject to any disclaimer, the term of this patent is extended or adjusted under 35 U.S.C. 154(b) by 330 days.

(21) Appl. No.: 10/898,779

(22) Filed: Jul. 26, 2004

(65) Prior Publication Data

US 2005/0041377 A1 Feb. 24, 2005

(30) Foreign Application Priority Data

Aug. 20, 2003 (TW) .............................. 92122842 A

(51) Int. Cl.
*G06F 1/16* (2006.01)
*H04B 1/08* (2006.01)

(52) U.S. Cl. .................. 361/679; 455/550.1; D14/138; 429/34

(58) Field of Classification Search ........ 361/679–687, 361/724–727; 348/375; 455/550.1; 343/702; D14/138; 429/34
See application file for complete search history.

(56) References Cited

U.S. PATENT DOCUMENTS

D435,837 S * 1/2001 Suzuki et al. .............. D14/138

6,636,181 B2 * 10/2003 Asano et al. ............... 343/702
6,754,507 B2 * 6/2004 Takagi ...................... 455/550.1
2005/0078210 A1 * 4/2005 Horiguchi ................... 348/375

FOREIGN PATENT DOCUMENTS

TW 089202838 2/2000
TW 090215728 9/2001

* cited by examiner

*Primary Examiner*—Hung Van Duong
(74) *Attorney, Agent, or Firm*—Thomas, Kayden, Horstemeyer & Risley

(57) ABSTRACT

A portable electronic apparatus. The portable electronic apparatus comprises a body, a image-retrieving device, an operational interface, and a first display. The body has a main surface, a rear surface, a first side, a second side, a third side and a fourth side. The main surface is opposite to the rear surface. The first side is a flat surface. The second side connects the third side and the fourth side with arc surfaces. The second side is a curved surface. The operational interface and the first display are disposed on the main surface.

8 Claims, 5 Drawing Sheets

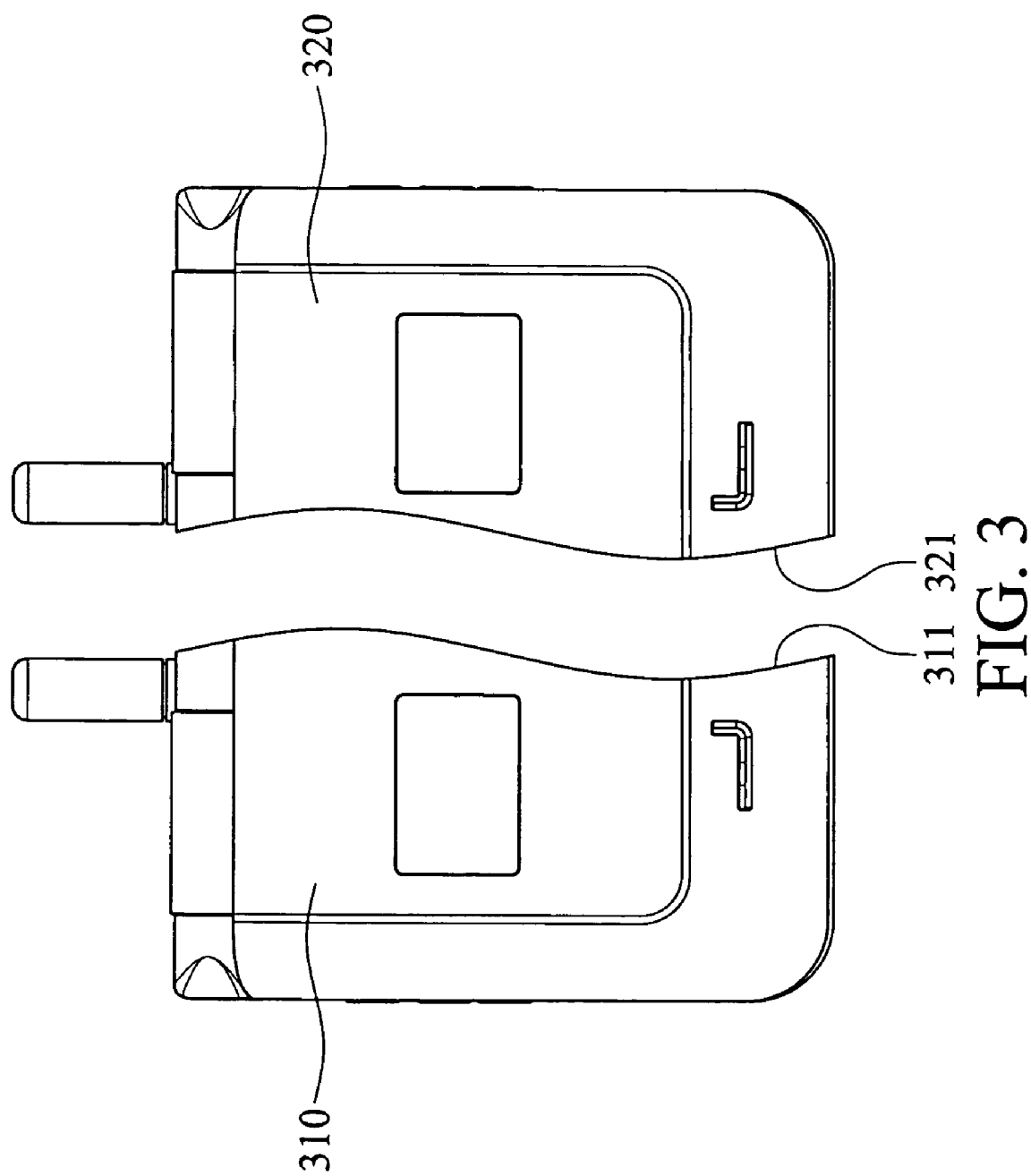

PORTABLE ELECTRONICS APPARATUS

BACKGROUND OF THE INVENTION

1. Field of the Invention

The present invention relates to a portable electronic apparatus, and in particular to the portable electronic apparatus that has special profile.

2. Description of the Related Art

A conventional portable electronic apparatus combines multiple functions. For example, a cell phone combines functions of a clock, an alarm clock and a digital camera. The conventional portable electronic apparatus generally has curved sides so that the portable electronic apparatus is not easy to stably stand on a supporting surface. As a result, the portable electronic device cannot be used as a tripod to stably support the digital camera when the user takes pictures. To be short, the conventional portable electronic apparatus, however, is incapable of remaining stable on a surface.

SUMMARY OF THE INVENTION

An embodiment of the present invention provides a portable electronic apparatus. The portable electronic apparatus comprises a body, a image-retrieving device, an operational interface, and a first display. The body has a main surface, a rear surface, a first side, a second side, a third side and a fourth side. The main surface is opposite to the rear surface. The first side is a flat surface. The second side connects the third side and the fourth side with arc surfaces. The second side is a curved surface. The operational interface and the first display are disposed on the main surface.

One of the embodiments of he present invention is capable of standing firmly on a supporting surface with the first side. The first side closely contacts the supporting surface. The present invention with a clock or an alarm clock function can be placed in a bedroom or a living room to replace the conventional alarm clock. The present invention with a image-retrieving device can stand firmly on a surface and automatically capture an image. The curved shape of the second side provides a grip for holding the apparatus.

BRIEF DESCRIPTION OF THE DRAWINGS

The present invention can be more fully understood by reading the subsequent detailed description and examples with references made to the accompanying drawings, wherein:

FIG. 3 shows the third embodiment of the present invention.

DETAILED DESCRIPTION OF THE INVENTION

Figure 1B:
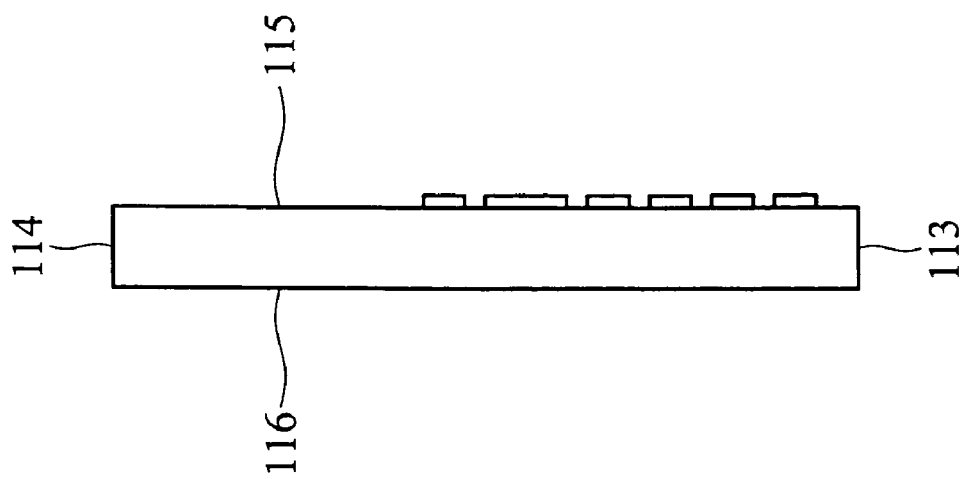
FIG. 1b is a view of direction A of the first embodiment.
Figure 1A:
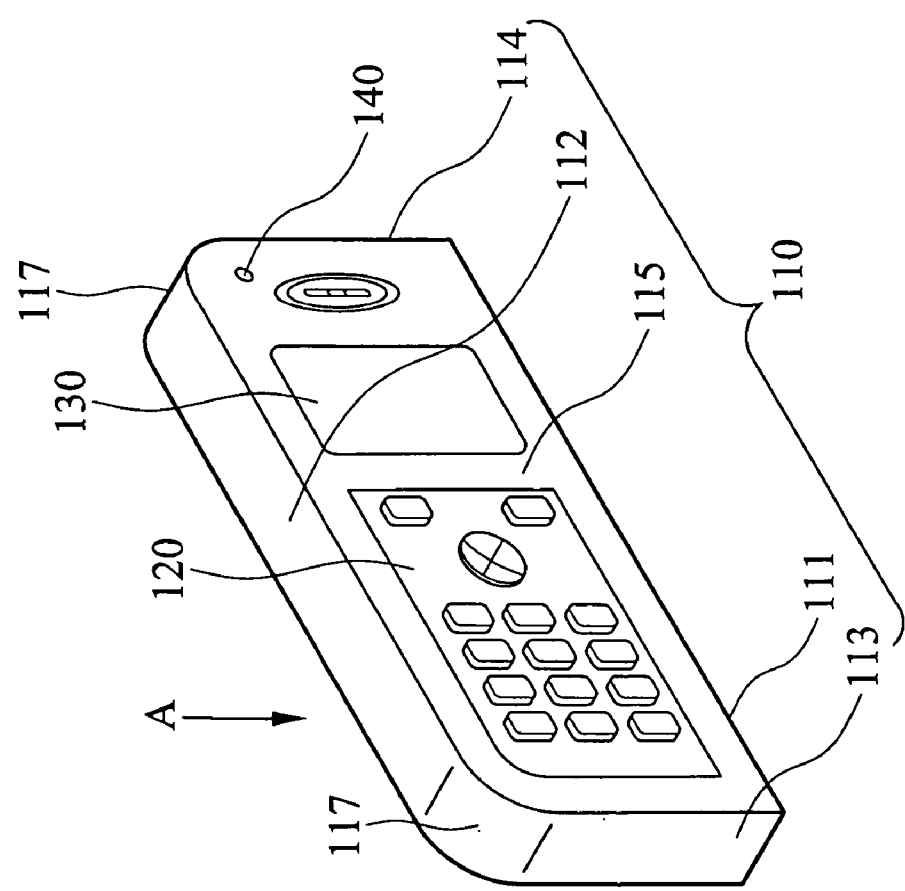
FIG. 1a shows the first embodiment of the present invention.

FIG. 1a shows the first embodiment of the present invention, which comprises a body 110, an image-retrieving device (CCD) 140, an operational interface 120, and a first display 130. The body 110 has a main surface 115, a rear surface 116 (refer to FIG. 1b), a first side (right side) 111, a second side (left side) 112, a third side 113, and a fourth side 114. The main surface 115 is opposite to the rear surface 116. The first side 111 is opposite to the second side 112. The first side 111 is a flat surface and has a flat first bottom (right bottom). The second side 112 connects to the third side 113 and the fourth side 114 with arc surfaces. The second bottom (left bottom) 117 of the second side 112 is a curved surface. The operational interface 120 and the first display 130 are disposed on the main surface 115. When the portable electronic apparatus of the first embodiment is placed on a supporting surface, the substantial flat first side 111 and first bottom stabilizing the portable electronic apparatus, and the curved second bottom 117 makes a better feeling for the holding hand. A recess can be formed on the first side 111, but cannot decrease the stability of the portable electronic apparatus.

Figure 2A:
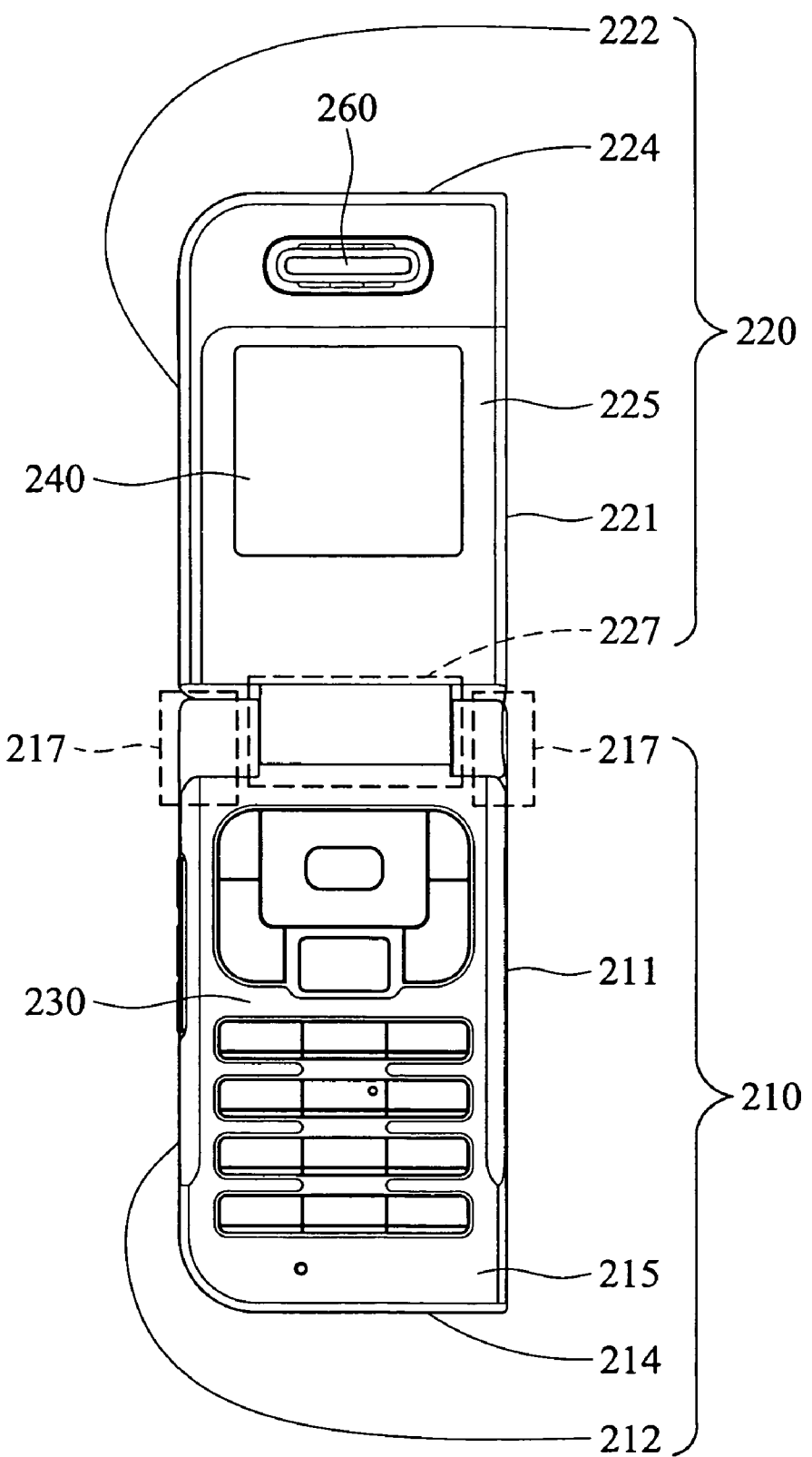
FIG. 2a shows the second embodiment of the present invention.
Figure 2C:
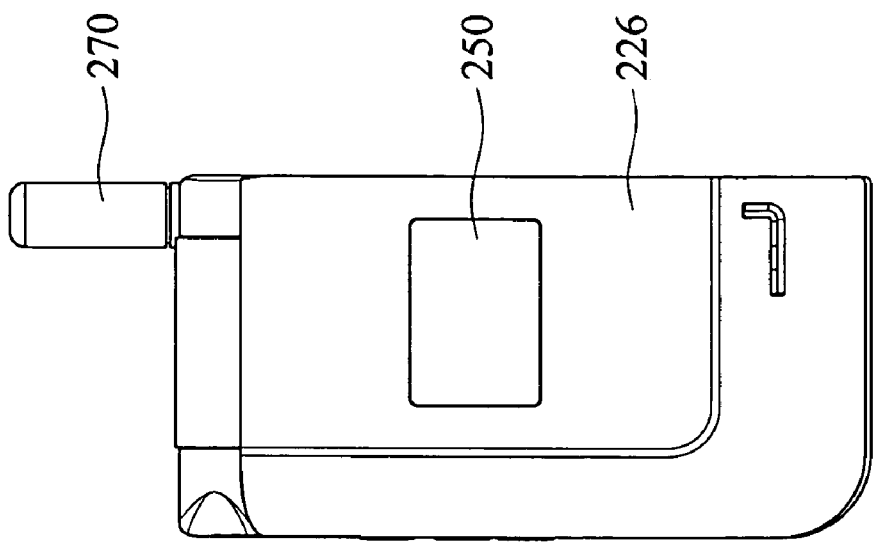
FIG. 2c is a front view of the second embodiment.
Figure 2B:
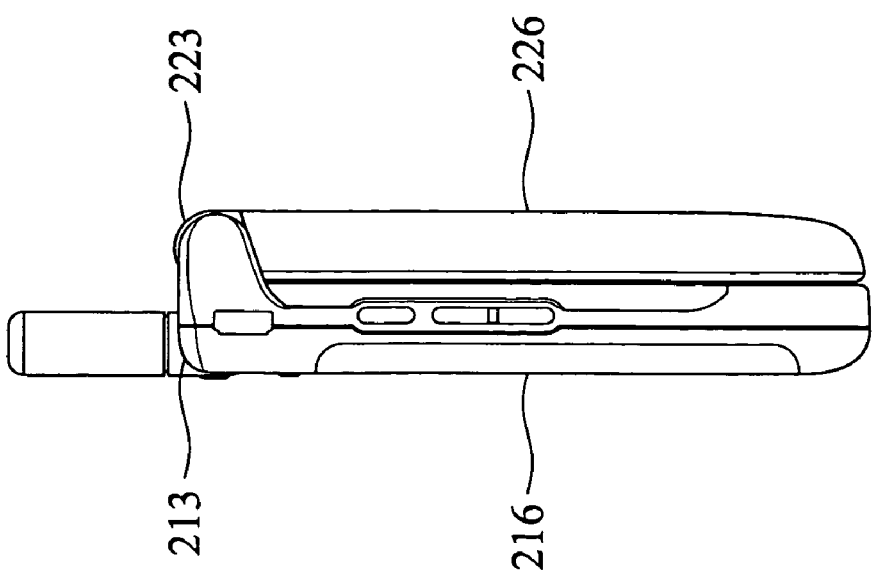
FIG. 2b is a side view of the second embodiment.
Figure 2D:
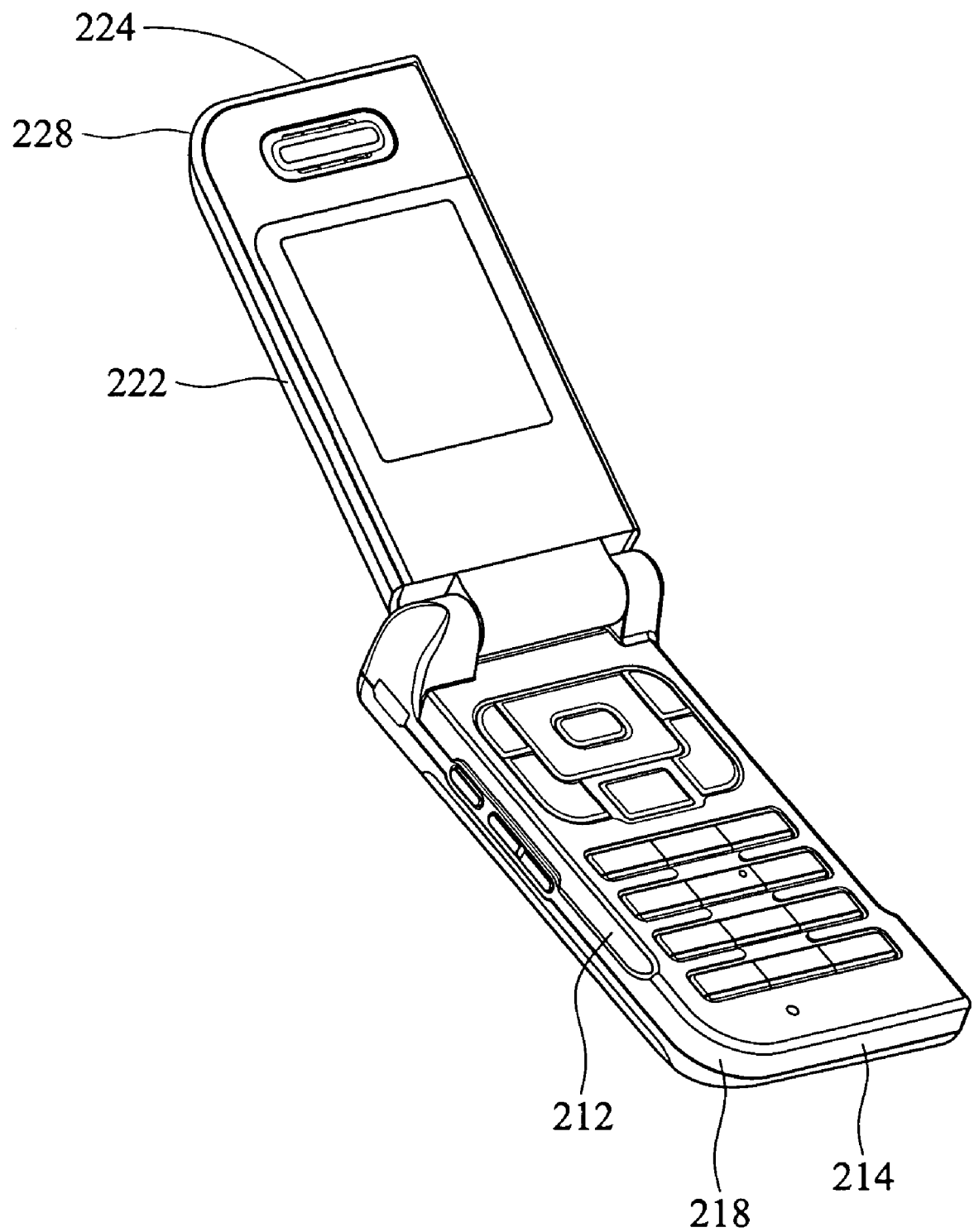
FIG. 2d is a perspective view of the second embodiment.

FIGS. 2a to 2d show the second embodiment of the present invention. As shown in FIG. 2a, the second embodiment comprises a body 210, a cover 220, a operational interface 230, a first display 240, and a loudspeaker 260. As shown in FIG. 2c, the second embodiment further comprises a second display 250 and an antenna 270. Please refer to FIG. 2a, the body 210 has a main body surface 215, a rear body surface 216 (refer to FIG. 2b), a first body side 211, a second body side 212 (refer to FIG. 2d), a third body side 213 (refer to FIG. 2b), a fourth body side 214 (refer to FIG. 2d) and a first pivot portion 217. The main body surface 215 is opposite to the rear body surface 216. The first body side 211 is a flat surface having a first bottom. The second body side 212 connects the fourth body side 214 with an arc surface. The second body side 212 has a second bottom 218, which is a curved surface (refer to FIG. 2d). The first pivot portion 217 and the antenna 270 are disposed on the third body side 213. The operational interface 230 is disposed on the main body surface 215. The cover 220 has a main cover surface 225, a rear cover surface 226 (refer to FIG. 2b), a first cover side 221, a second cover side 222 (refer to FIG. 2d), a third cover side 223 (refer to FIG. 2b), a fourth cover side 224 and a second pivot portion 227. The main cover surface 225 is opposite to the rear cover surface 226. The first cover side 221 is a flat surface having a first cover bottom. The second cover side 222 connects the fourth cover side 224 with an arc surface. The second cover side 222 has a second cover bottom 228, which is a curved surface (refer to FIG. 2d). The second pivot portion 227 is disposed on the third cover side 223 and rotatably connected to the first pivot portion 217. The second body side 212 and the second cover side 222 compose a continuous curved shape. The first display 240 and the loudspeaker 260 are disposed on the main cover surface 225. The second display 250 is disposed on the rear cover surface 226 (refer to FIG. 2c). The second embodiment mentioned above can further comprise a image-retrieving device (e.g. charge-coupled device (CCD)) disposed on the surface of the body 210 or the cover 220.

When the portable electronic apparatus of the second embodiment is placed on a supporting surface, the first body side 211 and the first cover side 221 stabilizing the portable electronic apparatus thereon. The curved surfaces of the second body side 212 and the second cover side 222 make a better feeling for the holding hand. A recess can be formed on the second body side 212 or the second cover side 222, but cannot decrease the stability of the portable electronic apparatus.

FIG. 3 shows a third embodiment of the present invention, which is a combination of portable electronic apparatuses.

The third embodiment comprises a first portable electronic apparatus 310 and second portable electronic apparatus 320. The combination reduces the space for placing the first and second electronic apparatuses. The first portable electronic apparatus 310 has a right side 311, which is substantially a first predetermined curved surface. The second portable electronic apparatus 320 has a left side 321, which is substantially a second predetermined curved surface corresponding to the first curved surface for combining with each other. Specifically, as shown in FIG. 3, the profile of the first portable electronic apparatus is asymmetrical. In some cases, the profile of the second portable electronic apparatus is the reflection of the profile of the first portable electronic apparatus, wherein the right and left sides 311 and 321 can be flat surfaces. In other embodiments, the profiles of the first and the second portable electronic apparatus can be wave curve surfaces or convexo-concave surfaces. If the right side 311 is a first wave curve surface and the left side 321 is a second wave curve surface, the wave peak of the first wave curve surface contacts the wave trough of the second wave curve surface, and the wave trough of the first wave curve surface contacts the wave peak of the second wave curve surface. If the right side is a convex surface and the left side is a concave surface, the convex surface closely contacts the concave surface. The combination can further has a first antenna 312 disposed on the surface of the first portable electronic apparatus 310 near the right side 311 and a second antenna 322 disposed on the surface of the second portable electronic apparatus 320 near the left side 321. A first circuit is disposed in the first portable electronic apparatus 310 and a second circuit is disposed in the second portable electronic apparatus 320.

The present invention is capable of standing firmly on a supporting surface with the first side. The first side stabilizes the present invention on the supporting surface. The present invention with a clock or an alarm clock function can be placed in a bedroom or a living room to replace a conventional clock. The present invention with a image-retrieving device can stand firmly on a surface and automatically capture an image. The curved shape of the second side provides a better feeling for holding the apparatus. Additionally, the combination of portable electronic apparatuses of the present invention has smaller profile.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A combination of portable electronic apparatuses, comprising:
   a first portable electronic apparatus, having a right side having a first surface; and
   a second portable electronic apparatus, having a left side having a second surface corresponding to the first surface for combining with each other thereby reducing the space for placing the first and second electronic apparatuses.

2. The combination as claimed in claim 1 wherein the first and second surfaces are curved surfaces combined with each other.

3. The combination as claimed in claim 1, wherein the first and second surfaces are flat surfaces combined with each other.

4. The combination as claimed in claim 1, wherein the first and second surfaces are wave curve surfaces, such that the wave peak of the first wave curve surface is combined with the wave trough of the second wave curve surface, and the wave trough of the first wave curve surface is combined with the wave peak of the second wave curve surface.

5. The combination as claimed in claim 1, wherein the first and second surfaces are convexo-concave surfaces, such that the concave part of the first surface is combined with the convex part of the second curved surface, and the convex part of the first curved surface is combined with the concave part of the second curved surface.

6. The combination as claimed in claim 5 further comprising a first antenna disposed on the convex part of the first surface of the first portable electronic apparatus and a second antenna disposed on the convex part of the second curved surface of the second portable electronic apparatus.

7. A portable electronic apparatus stably placed on a supporting surface, comprising:
   a body, having:
      a main body surface,
      a rear body surface oinosite to the main body surface;
      a first body side corresponding to the supporting surface, wherein the first
      body side is substantially a flat surface;
      a second body side;
      a third body side;
      a fourth body side connecting to the second body side with an first arc surface;
      a first pivot portion disposed on the third body side;
   a cover, having:
      a main cover surface,
      a rear cover surface opposite to the main cover surface;
      a first cover side corresponding to the supporting surface, wherein the first
      cover side is substantially a flat surface;
      a second cover side;
      a third cover side;
      a fourth cover side. connecting to the second cover side with an second arc surface; and
      a second pivot portion disposed on the third cover side and hinged to the
      first pivot portion;
   an operating interface disposed on the main body surface;
   a first display disposed on the main cover surface; and
   second display disposed on the rear cover surface.

8. A combination of portable electronic apparatuses, comprising: a first portable electronic apparatus, having a first circuit disposed therein; and
   a second portable electronic apparatus, having a second circuit disposed therein, wherein the profile of the first portable electronic apparatus is asymmetrical, and the profile of the second portable electronic apparatus is the reflection of the profile of the first portable electronic apparatus.

* * * * *